United States Patent
Nelemans et al.

(10) Patent No.: US 9,889,407 B2
(45) Date of Patent: Feb. 13, 2018

(54) DEVICE SUITABLE FOR TREATMENT OF A FLUID AS WELL AS A METHOD AND MACHINE SUITABLE FOR THE MANUFACTURE OF SUCH A DEVICE

(71) Applicant: AKA PATENTEN B.V., Sittard (NL)

(72) Inventors: Bert Johan Nelemans, Spaubeek (NL); Jochem Franciscus Edith Lahaije, Bunde (NL)

(73) Assignee: AKA Patenten B.V., Sittard (NL)

( * ) Notice: Subject to any disclaimer, the term of this patent is extended or adjusted under 35 U.S.C. 154(b) by 632 days.

(21) Appl. No.: 14/387,353

(22) PCT Filed: Mar. 22, 2013

(86) PCT No.: PCT/EP2013/056043
§ 371 (c)(1),
(2) Date: Sep. 23, 2014

(87) PCT Pub. No.: WO2013/144004
PCT Pub. Date: Oct. 3, 2013

(65) Prior Publication Data
US 2015/0090657 A1    Apr. 2, 2015

(30) Foreign Application Priority Data

Mar. 29, 2012 (NL) ..................................... 2008565

(51) Int. Cl.
*B01D 63/10* (2006.01)
*B01D 63/06* (2006.01)
(Continued)

(52) U.S. Cl.
CPC .......... *B01D 63/10* (2013.01); *B01D 63/067* (2013.01); *B01D 65/003* (2013.01); *B23P 15/26* (2013.01);
(Continued)

(58) Field of Classification Search
CPC .... B01D 63/10; B01D 65/003; B01D 63/067; B01D 2313/14; B01D 2313/143;
(Continued)

(56) References Cited

U.S. PATENT DOCUMENTS 3,386,583 A * 6/1968 Merten .................. B01D 63/10
                                                     210/321.83
4,128,479 A * 12/1978 Malchesky ............ B01D 63/10
                                                     210/321.74
(Continued)

FOREIGN PATENT DOCUMENTS

EA    200702107 A1    4/2008
EP       0626192 A1   11/1994
(Continued)

OTHER PUBLICATIONS

Search and Examination Report issued by the Intellectual Property Office of Singapore in connection with Singapore Application No. 11201406176U, dated Mar. 10, 2016, 7 pages.

(Continued)

*Primary Examiner* — David C Mellon
(74) *Attorney, Agent, or Firm* — Barnes & Thornburg LLP

(57) ABSTRACT

A device, which is suitable for the processing of at least one fluid, is provided with at least one elongated foil, which is formed in a number of reciprocating foil layers. Between two opposite layers of foil, a spacer is situated that is permeable at least parallel to the foil layers. The foil layers and interposed spacers extend spirally around a central axis, wherein folding lines between two foil layers extend substantially parallel to the central axis. Each spacer is coupled to at least an end near the central axis with a support extending parallel to the central axis where, of the supports near the central axis, first supports are situated between two foil layers, which foil layers are connected to one another near the central axis, whereas second supports are situated between two successive first supports.

13 Claims, 12 Drawing Sheets

(51) Int. Cl.
*F28F 9/007* (2006.01)
*F28F 21/06* (2006.01)
*F28D 9/04* (2006.01)
*B01D 65/00* (2006.01)
*B23P 15/26* (2006.01)

(52) U.S. Cl.
CPC ............. *F28D 9/04* (2013.01); *F28F 9/007* (2013.01); *F28F 9/0075* (2013.01); *F28F 21/065* (2013.01); *B01D 2313/14* (2013.01); *B01D 2313/143* (2013.01); *B01D 2313/146* (2013.01); *B01D 2323/42* (2013.01); *F28F 2240/00* (2013.01); *F28F 2255/02* (2013.01); *Y10T 29/4935* (2015.01); *Y10T 29/49826* (2015.01)

(58) Field of Classification Search
CPC ........... B01D 2313/146; B01D 2323/42; F28F 9/007; F28F 21/065; F28F 9/0075; F28F 2255/02; F28F 2240/00; B23P 15/26; F28D 9/04; Y10T 29/49826; Y10T 29/4935
See application file for complete search history.

(56) References Cited

U.S. PATENT DOCUMENTS

| | | | |
|---|---|---|---|
| 4,294,078 A * | 10/1981 | MacCracken | F28D 20/021 126/618 |
| 4,680,118 A | 7/1987 | Taga | |
| 5,460,720 A | 10/1995 | Schneider | |
| 5,538,642 A * | 7/1996 | Solie | B01D 53/22 210/321.83 |
| 6,048,298 A | 4/2000 | Paul et al. | |
| 6,413,424 B1 * | 7/2002 | Shelby | B01D 61/10 210/321.74 |
| 2005/0269256 A1 | 12/2005 | Haq et al. | |
| 2008/0164202 A1 * | 7/2008 | Graham | B01D 61/10 210/457 |
| 2010/0224548 A1 * | 9/2010 | Tada | B01D 63/02 210/321.8 |
| 2011/0186416 A1 | 8/2011 | Nelemans et al. | |

FOREIGN PATENT DOCUMENTS

| | | |
|---|---|---|
| EP | 1022052 A2 | 7/2000 |
| JP | 63-125981 A | 11/1978 |
| NL | 2008565 C | 10/2013 |
| RU | 2071820 C1 | 1/1997 |
| WO | 2005094963 A1 | 10/2005 |
| WO | 2006105555 A1 | 10/2006 |
| WO | 2013/144004 A1 | 10/2013 |

OTHER PUBLICATIONS

PCT International Search Report and Written Opinion completed by the ISA/EP on Jun. 7, 2013 and issued in connection with PCT/EP2013/056043.
PCT International Preliminary Report on Patentability completed by the ISA/EP on Apr. 9, 2014 and issued in connection with PCT/EP2013/056043.

* cited by examiner

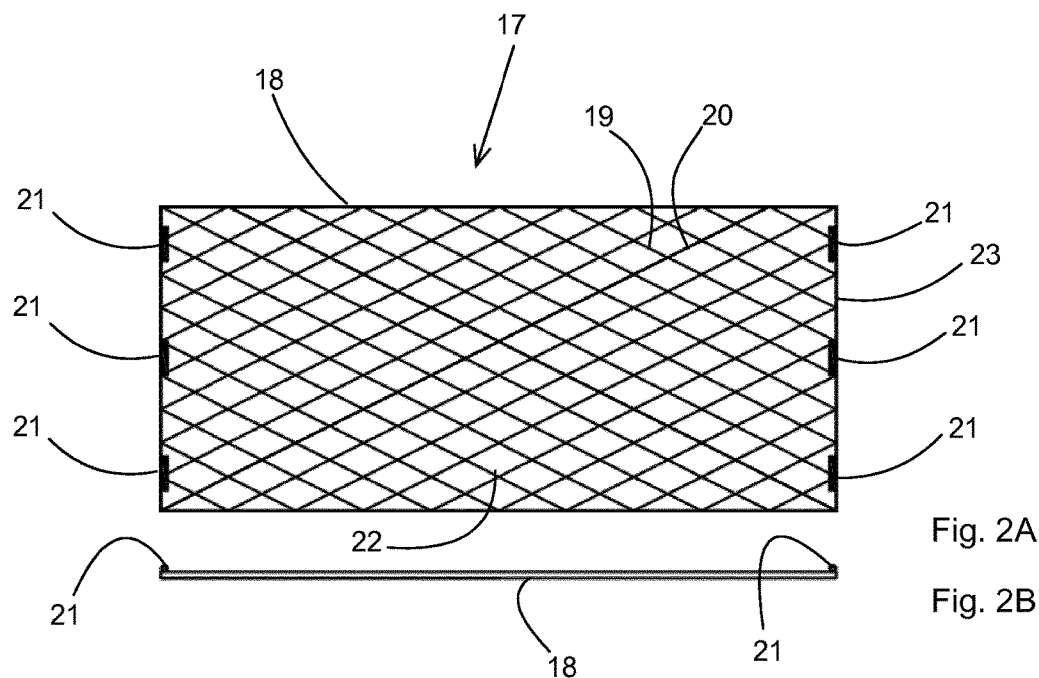
Fig. 2A
Fig. 2B
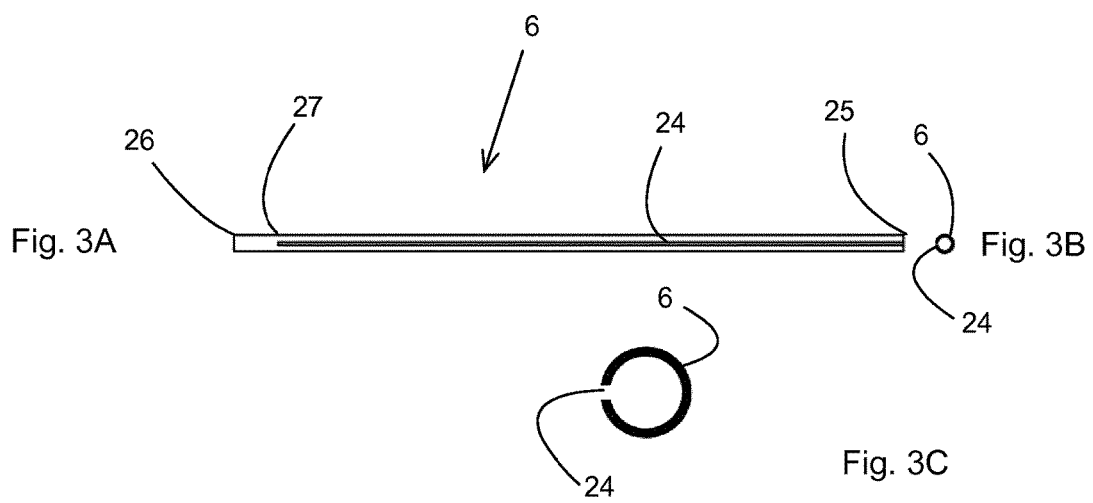
Fig. 3A
Fig. 3B
Fig. 3C

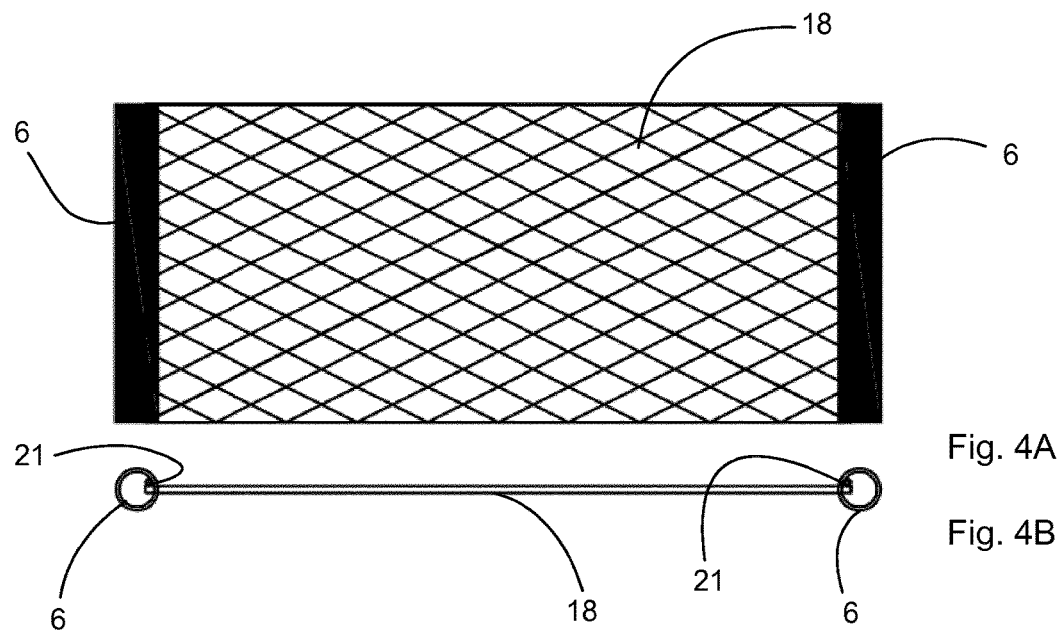
Fig. 4A
Fig. 4B
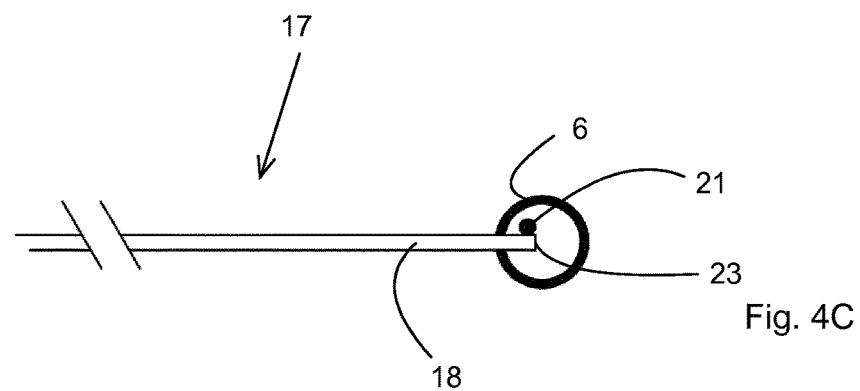
Fig. 4C

Fig. 5A1 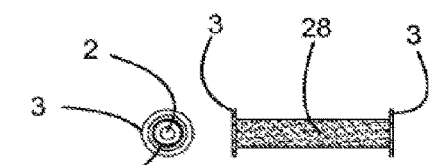 Fig. 5A2
Fig. 5B1 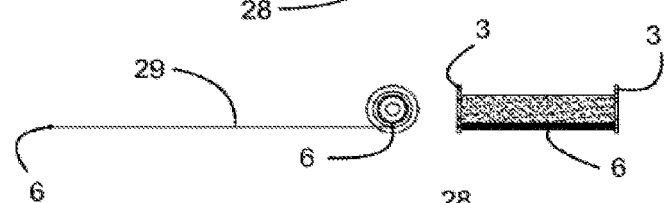 Fig. 5B2
Fig. 5C1 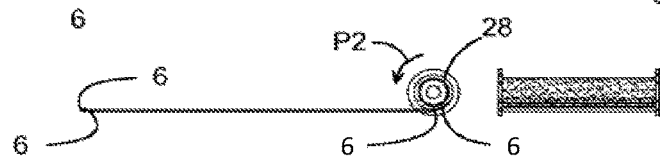 Fig. 5C2
Fig. 5D1 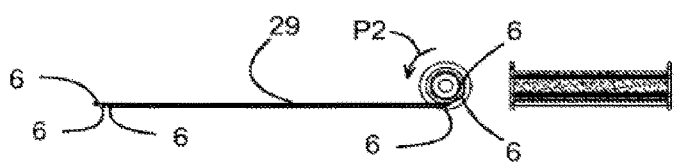 Fig. 5D2
Fig. 5E1 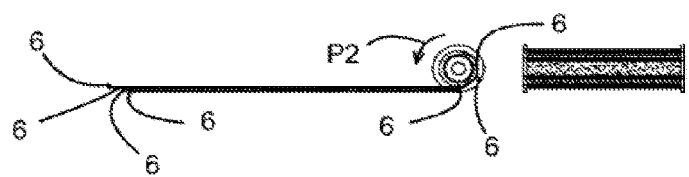 Fig. 5E2
Fig. 5F1  Fig. 5F2
Fig. 5G1 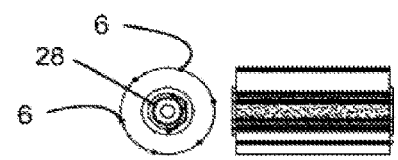 Fig. 5G2
Fig. 5H1 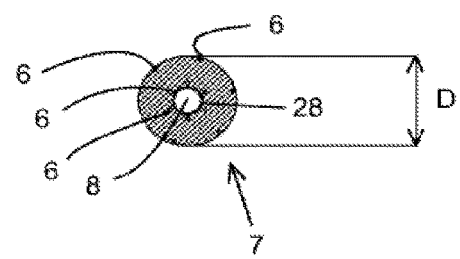

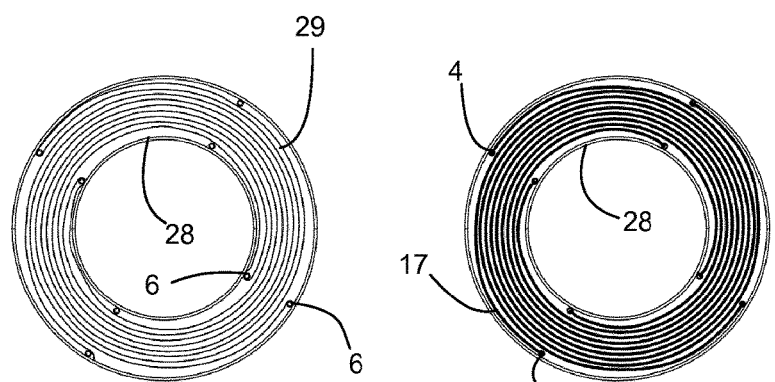
Fig. 8A
Fig. 8B
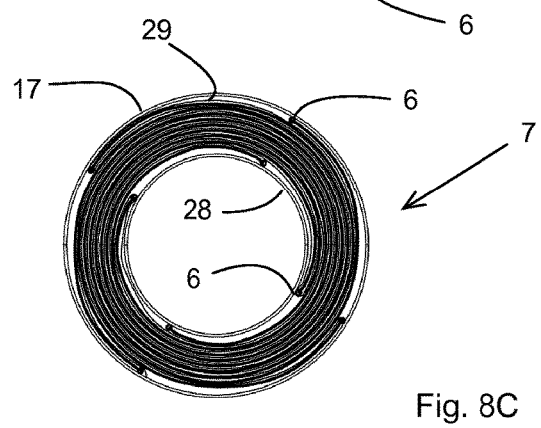
Fig. 8C

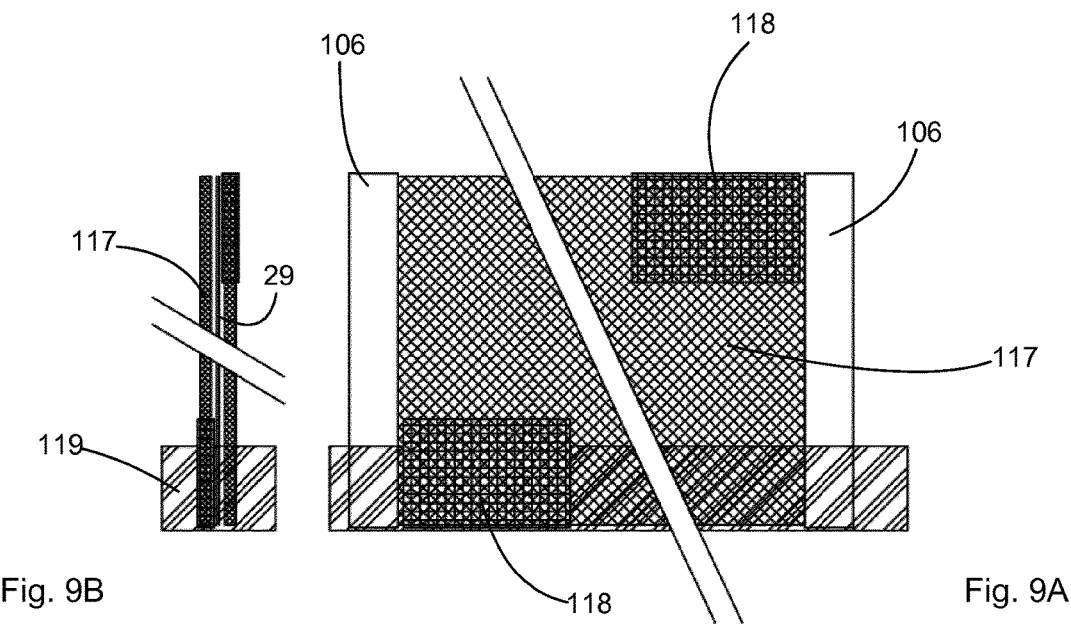
Fig. 9B　　　　　　　　　　　　　　　　　Fig. 9A
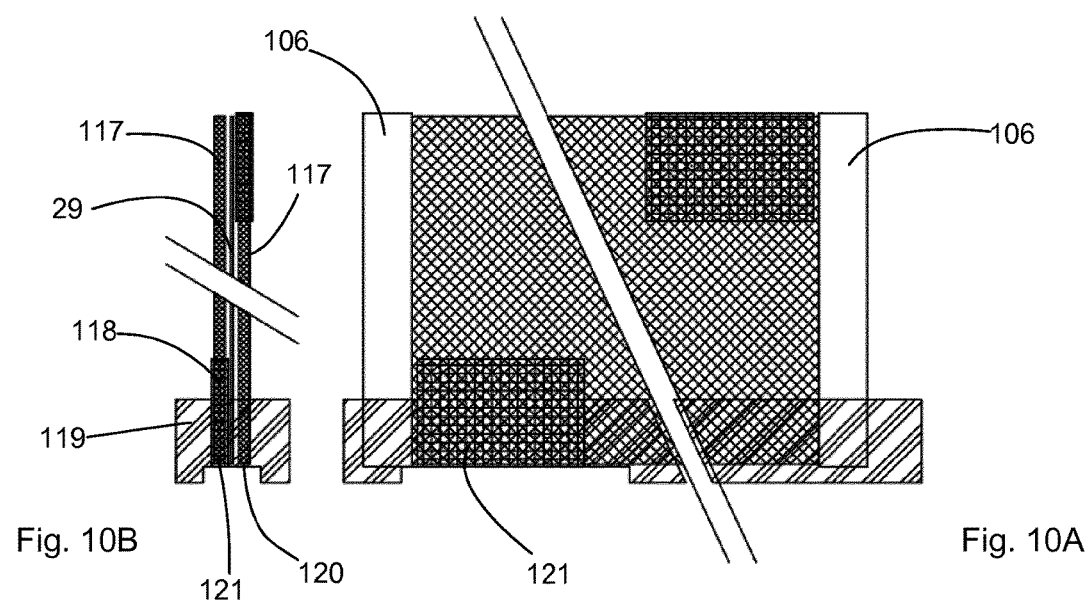
Fig. 10B　　　　　　　　　　　　　　　　　Fig. 10A

DEVICE SUITABLE FOR TREATMENT OF A FLUID AS WELL AS A METHOD AND MACHINE SUITABLE FOR THE MANUFACTURE OF SUCH A DEVICE

CROSS-REFERENCE TO RELATED APPLICATIONS

This application is a U.S. nationalization under 35 U.S.C. § 371 of International Application No. PCT/EP2013/056043 filed Mar. 22, 2013, which claims priority to Netherlands Patent Application No. 2008565 filed Mar. 29, 2012.

The invention relates to a device suitable for processing at least one fluid, which device is provided with at least one elongated foil that is formed in a number of reciprocating foil layers, wherein between two opposite foil layers a spacer is situated which is permeable at least parallel to the foil layers, said foil layers and interposed spacers extending spirally around a central axis, wherein folding lines between two foil layers extend substantially parallel to the central axis.

The invention further relates to a method and a machine suitable for the manufacture of such a device.

Depending on whether the foil is made of a heat-conducting foil, a membrane foil or a combination thereof, the device is suitable as a heat exchanger, a membrane filter, or a combination thereof. In a combination of, for example, a heat-conducting foil and a membrane foil, a spacer is situated between at least two foil layers of one of these foils.

In such a device, described in WO2010/011138 of the applicant and in the device shown in the FIGS. 8-10, the foil layers and the interposed mesh-like spacer extend spirally from a centerline of a cylindrical container to the exterior of the cylindrical holder. Because of the cylindrical shape, relatively large pressures may be applied. As is clearly visible in the FIGS. 8-10, the device shown in WO2010/011138 comprises a relatively large number of foil layers, which makes the manufacture of such a device relatively complex.

The invention aims to provide a device which combines the advantages of the known device and which is relatively simple to manufacture.

This objective is accomplished with the device according to the invention, in that each spacer is coupled at least at an end near the central axis with a support extending parallel to the central axis where, of the supports near the central axis, first supports are situated between two foil layers, which foil layers are connected to one another near the central axis, whereas second supports are situated between two successive first supports.

When spirally winding the foil layers around the central axis, the foil layers and the spacers can be firmly held by means of the supports that are coupled with the ends of the spacers near the central axis. The foil layers and the intervening spacers may subsequently be spirally wound around the central axis in a number of turns.

After the manufacturing of the device, a good support of the foil layers is obtained by the supports and the spacer. Moreover, the foil layers are shielded by the supports from possible sharp edges of the spacers.

An embodiment of the device according to the invention is characterized in that each spacer is coupled at both ends with a support.

This means that during the winding of the foil layers and the interposed spacers around the central axis, via the supports a tension force on the foil layers can be applied at the ends averted from the central axis, so that during winding the foil layers remain tightly tautened and do not undesirably curl.

After the manufacture of the device a cylindrical device is obtained, wherein a good support of the foil layers is obtained by the supports, both on the inside and the outside of the cylindrical device.

Another embodiment of the device according to the invention is characterized in that the support is tubular.

The tubular supports are hereby applicable as supply- and discharge channels. Moreover, in the tubular support a gripping means can simply be detachably attached for the fabrication of the device.

Another embodiment of the device according to the invention is characterized in that the support is provided with at least one aperture facing the spacer.

In this way, it is possible to use the support not only as gripping means during the manufacturing process, or as a support and shield for the spacer, but also simply as supply- or discharge channel of a fluid to be processed by the device. Via the aperture the fluid can flow from the space situated between the foil layers to the space bounded by the tubular support, and vice versa.

A further embodiment of the device according to the invention is characterized in that the aperture comprises an elongated slot extending parallel to the central axis, in which the end of the spacer is situated.

In this way a simple coupling of the spacer with the support is obtained. The aperture serves hereby for coupling of the spacer but also as passage for fluid.

Yet another embodiment of the device according to the invention is characterized in that the end of the spacer located the in tubular support is provided with a thicker portion that extends over at least part of the end.

Because of the thicker portion it is possible to link the spacer easily with the support, by sliding the thicker portion that is functioning as a tendon into the support, whereby the spacer extends through the slot. Here the thicker portion should be of such dimensions that it is not movable through the slot in radial direction.

A still further embodiment of the device according to the invention is characterized in that the elongated slot extends from a first end of the tubular support to a predetermined distance from the second end of the tubular support.

While fitting the spacer via the first end into the slot, a stop is formed by the second end, which simply prevents further movement of the tubular support in axial direction.

A still further embodiment of the device according to the invention is characterized in that at least the tubular supports near the central axis are positioned alternately with first and second ends to the axial ends of the spirally wound foil layers and spacers.

As a result, two sets of supports are formed as it were, in which a first set of supports is located in a first space that is separated by the foil layers from a second space in which the second set of supports is located. After the winding of the foil layers, the first ends of all the supports can for example be shut and the second ends can be connected to a fluid supply or drain. Here, the first space is accessible via a first axial side of the cylindrical device, whereas the second space is then accessible via a second side of the cylindrical device that is averted from the first axial side.

A still further embodiment of the device according to the invention is characterized in that at least the tubular supports near the central axis are alternately connected to a first and second fluid channel.

As a result, two sets of supports are formed as it were, in which a first set of supports is located in a first space that is separated by the foil layers from a second space, while the spaces are connected to different fluid channels. In a similar manner the tubular supports located at the averted side of the central axis can be connected to a third and fourth fluid channel. Here, the first and third fluid channels are connected to the first space, whereas the second and fourth fluid channels are connected to the second space.

A still further embodiment of the device according to the invention is characterized in that the first fluid channel is positioned at a first axial end of the spirally wound foil layers and spacers, whereas the second fluid channel is positioned at a second axial end of the spirally wound foil layers and spacers, the second end being averted from the first fluid channel.

As a result, the fluid channels are simply separated from each other and easily accessible from either side of the cylindrical device. In a similar manner, tubular supports located at a side averted from the central axis can also be alternately connected to two different fluid channels. The fluid channels that are connected to the same space, and located close to the central axis and distant from the central axis respectively, serve as supply- and discharge channels, or vice versa.

A still further embodiment of the device according to the invention is characterized in that the tubular supports, connected to the first respectively second axial end on the first respectively second fluid channel, are sealed at the second respectively first axial end.

Because of the sealed ends, it is effectuated in a simple manner that the fluid can only flow from the device at the desired axial side.

An embodiment of the device according to the invention is characterized in that the axial ends of the spirally wound layers of foil are sealed by means of a seal.

The entire axial side can herewith be easily sealed, with the exception of the desired passages in the ends of the supports, for example by means of a resin or a kit.

An embodiment of the device according to the invention is characterized in that a sealing foil portion of the foil is connected to a first foil layer, extending towards and being connected to the last foil layer and extending towards and again being connected to the first foil layer.

As a result, two enclosed spaces are formed that are completely separated from each other by the foil parts, which are completely sealed off in the circumferential direction of the cylindrical device by the sealing foil portion.

Only if the foil is a membrane foil, contact between the fluids in the different spaces is possible.

An embodiment of the device according to the invention is characterized in that the supports near the central axis are positioned around a central support tube.

The tubular supports lie alternately directly against the support tube or against the support tube with the intervention of the foil layer.

It is also possible that the support tube itself functions as a support for those spacers of which, in the case of individual supports, the supports would have lain directly against the support tube.

An embodiment of the device according to the invention is characterized in that at least near the central axis at least one additional support is situated between a first support and a second support, where, of the supports near the central axis, the first support is situated between two foil layers of a first foil, which foil layers of the first foil are connected to one another near the central axis, whereas the additional support, the two foil layers of a first foil as well as the first support are situated between two foil layers of a second foil, which foil layers of the second foil are connected to one another near the central axis.

The additional support is being used to guide near the central axis, the second foil around both the additional support, two foil layers of a first foil as well as the first support. In this manner an additional space is being created between the first and second foil for an additional fluid. If the additional support is tubular and provided with at least one aperture located between the first and second foil, the additional fluid can easily be guided into or out of the additional space through the tubular additional support.

It is possible to provide a number of additional supports between the first and the second support, whereby near the central axis a number of foils and, if desired an number of foil like spacers are wrapped around only the first support or around the first support and one additional support of around the first support and more additional supports. In all these cases near the central axis no foil need be wrapped around the second support.

The invention also aims to provide a method for the simple manufacture a device as described above.

This objective is accomplished with the method according to the invention in that a number of tubular supports extending parallel to one another are positioned between two rotatable elements on a central axis and are coupled therewith, wherein first ends of the spacers are coupled with the supports and the foil is wound in a reciprocating way alternately in foil layers around the first and second ends of the spacers, wherein the spacers and the foil layers extend substantially parallel to one another where, of the supports near the central axis, first supports are situated between two foil layers, which foil layers are connected to one another near the central axis, whereas second supports are situated between two successive first supports, whereupon the elements along with the foil layers and the spacers are rotated around the central axis, wherein the foil layers and the spacers are positioned spirally around the central axis.

With the method according to the invention, first a package of foil layers and spacers is formed that is extending substantially parallel to a plane. The package of foil layers and spacers can extend horizontally, in which case it can be easily carried by a carrier. The length of the carrier may simply be adjusted to the length of the package. However, it is also possible that the package extends vertically, in which case the foil layers and spacers are hanging on the disc-shaped elements, as it were. Here at a first side the supports, coupled with spacers, are coupled with the disc-shaped elements. Subsequently, the disc-shaped elements are rotated and the foil layers and the interposed spacers are wound to the orbit determined by the supports. Depending on the length of the foil layers and the thickness of the foil layers and spacers, a number of spiral windings will be formed. If desired, the disc-shaped elements may then be removed or be part of the final device.

An embodiment of the method according to the invention is characterized in that the axial ends of the spirally wound layers of foil are sealed by means of a seal.

The sealing is preferably done after the winding, because then an axial side can be sealed in one single operation.

The invention also aims to provide a machine by which, in a simple manner, a device as described above can be manufactured.

This objective is accomplished with the machine according to the invention, in that the machine is provided with at least two elements rotatable about a central axis, which elements are provided with fastening elements for detachably coupling of tubular supports between the elements, which machine is further provided with a substantially horizontally extending carrier and at least one foil roll holder that is movable in and opposite to the direction facing the central axis, relative to the carrier.

In this manner a foil layer can be positioned step by step, a support with an spacer coupled therewith can be placed on the foil layer and detachably connected to the disc-shaped elements, again a foil layer can be positioned etc., during which the foil roll holder is reciprocating over the spacers, and the disc-shaped elements are rotated each time after the application of a foil layer through an angle which is equal to 360 degrees, divided by the number of supports.

An embodiment of the machine according to the invention is characterized, in that the foil roll holder is moveable between the disc-shaped elements from one side of the central axis to the other side of the central axis and vice versa.

This allows the foil layer to be easily wrapped around the support and a fold line to be formed. For this purpose, a new support with spacer is connected to disc-shaped elements at the moment that the foil roll holder is positioned at a distance from the already-formed foil layers with interposed spacers, after which the foil roll holder is moved across the spacer to the end averted from the central axis of the spacer.

The invention will be further explained with reference to the accompanying drawings, in which:

FIGS. 2A and 2B show a top view and side view of a spacer of a device according to the invention;

Figure 6:
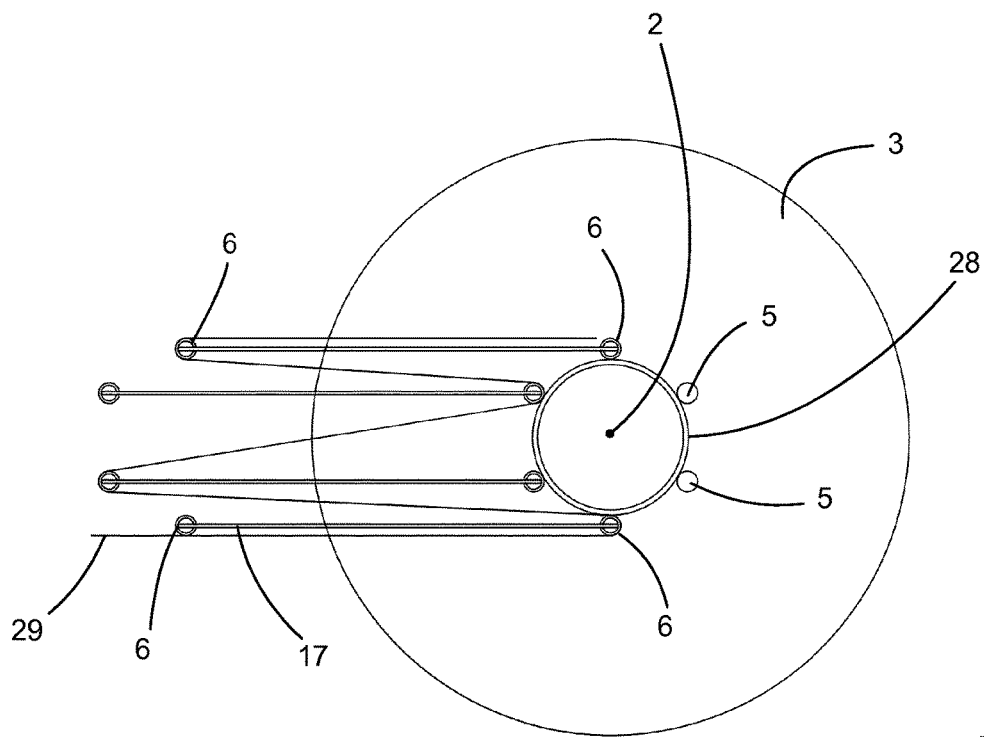
Figure 7:
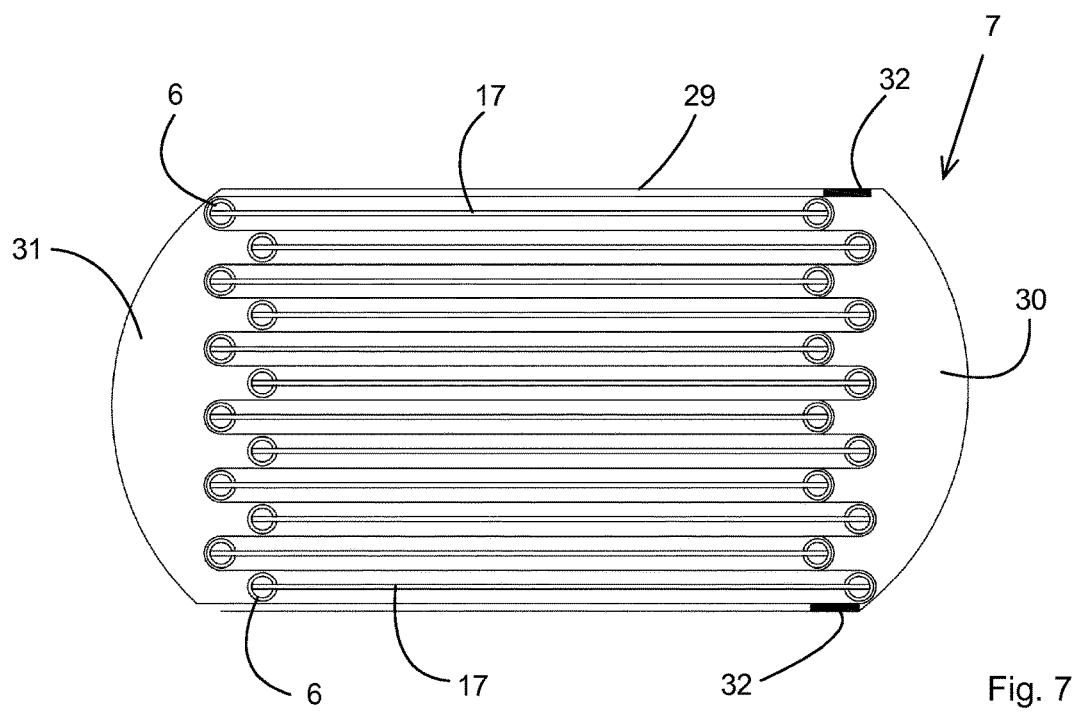

FIGS. 3A-3C, respectively, show a side view, a cross-sectional view and an enlarged cross-sectional view of a support of a device according to the invention;

FIGS. 4A-4C, respectively, show a top view, side view and enlarged view of a spacer shown in FIGS. 2A and 2B, which is coupled with the supports illustrated in FIGS. 3A-3C;

FIGS. 5A1 and 5A2-5H1 show side views and rear views illustrating a part the machine shown in the FIGS. 1A-1E, and of the device according to the invention, at various steps during the execution of the method according to the invention;

FIG. 6 shows schematically an enlarged side view of a part of the machine shown in the FIGS. 1A-1E, and of the devices according to the invention, at one step during the execution of the method according to the invention;

FIG. 7 schematically shows the course of the foil and the position of the spacers in a device according to the invention;

FIGS. 8A-8D, respectively, show a cross-section with only the supports and the foil layers, a cross-section with only the supports and spacers, a cross-section with the supports, the foil, as well as spacers and a perspective, partially cut away view of a device according to the invention;

FIGS. 9A-9B and 10A-10B are front views and side views of an alternative embodiment of a part of a device according to the invention, shown respectively during and after the manufacturing process;

FIGS. 11A-11B and 12A-12B are front views and side views of an alternative embodiment of a part of a device, with dual foil layers according to the invention, shown respectively during and after the manufacturing process.

Figures 13A, 13B:
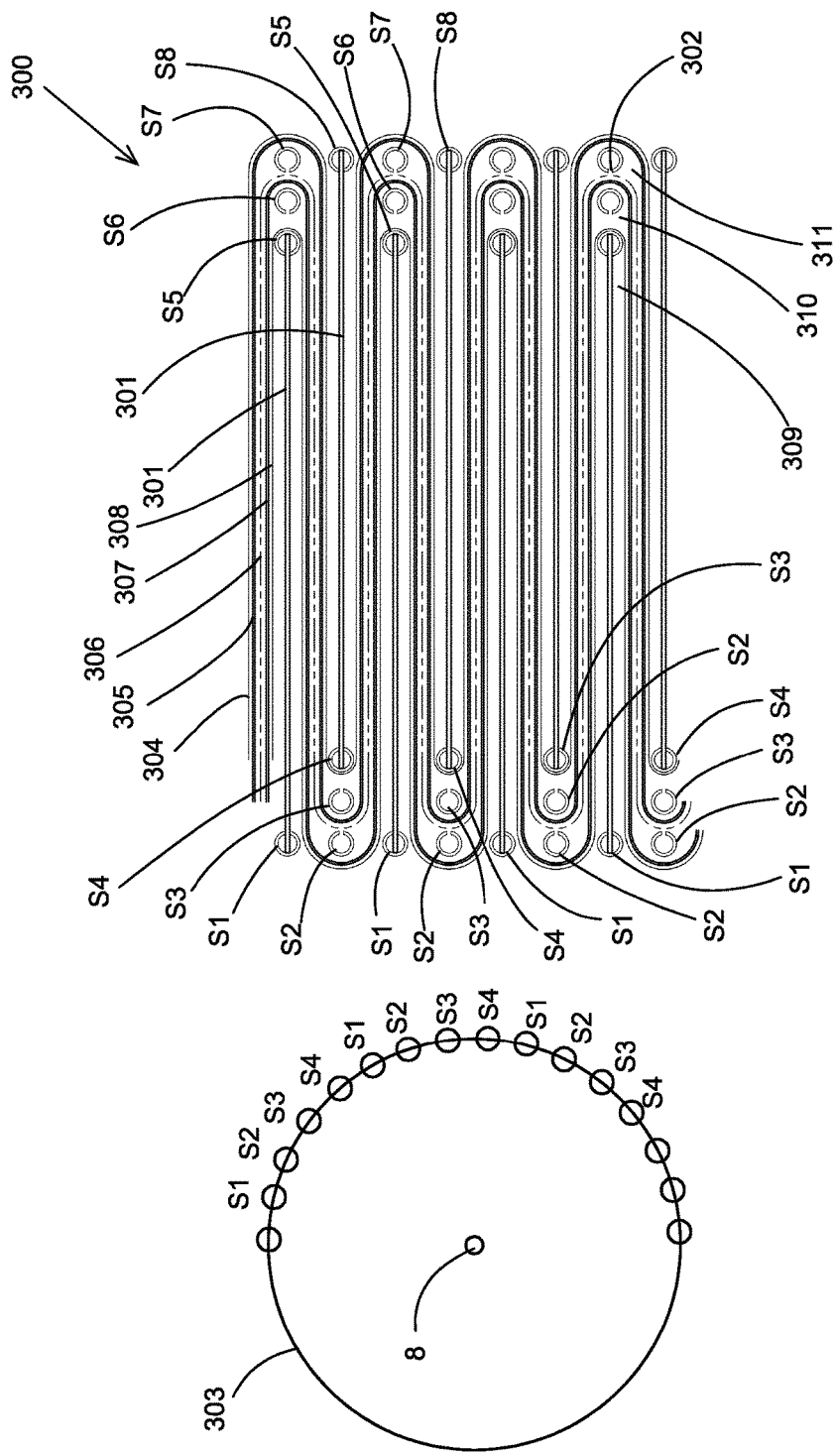
Figure 14:
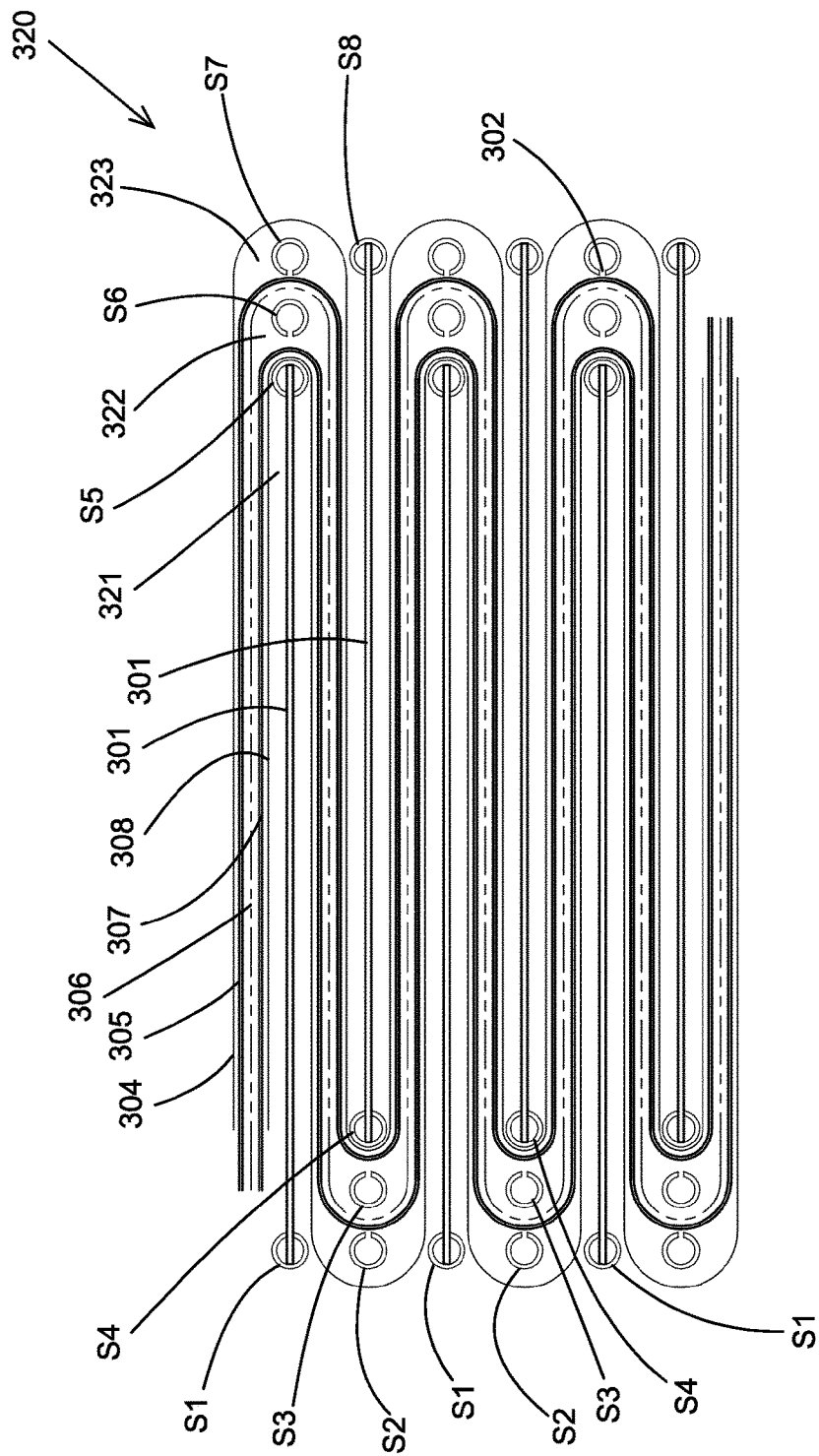
Figure 15:
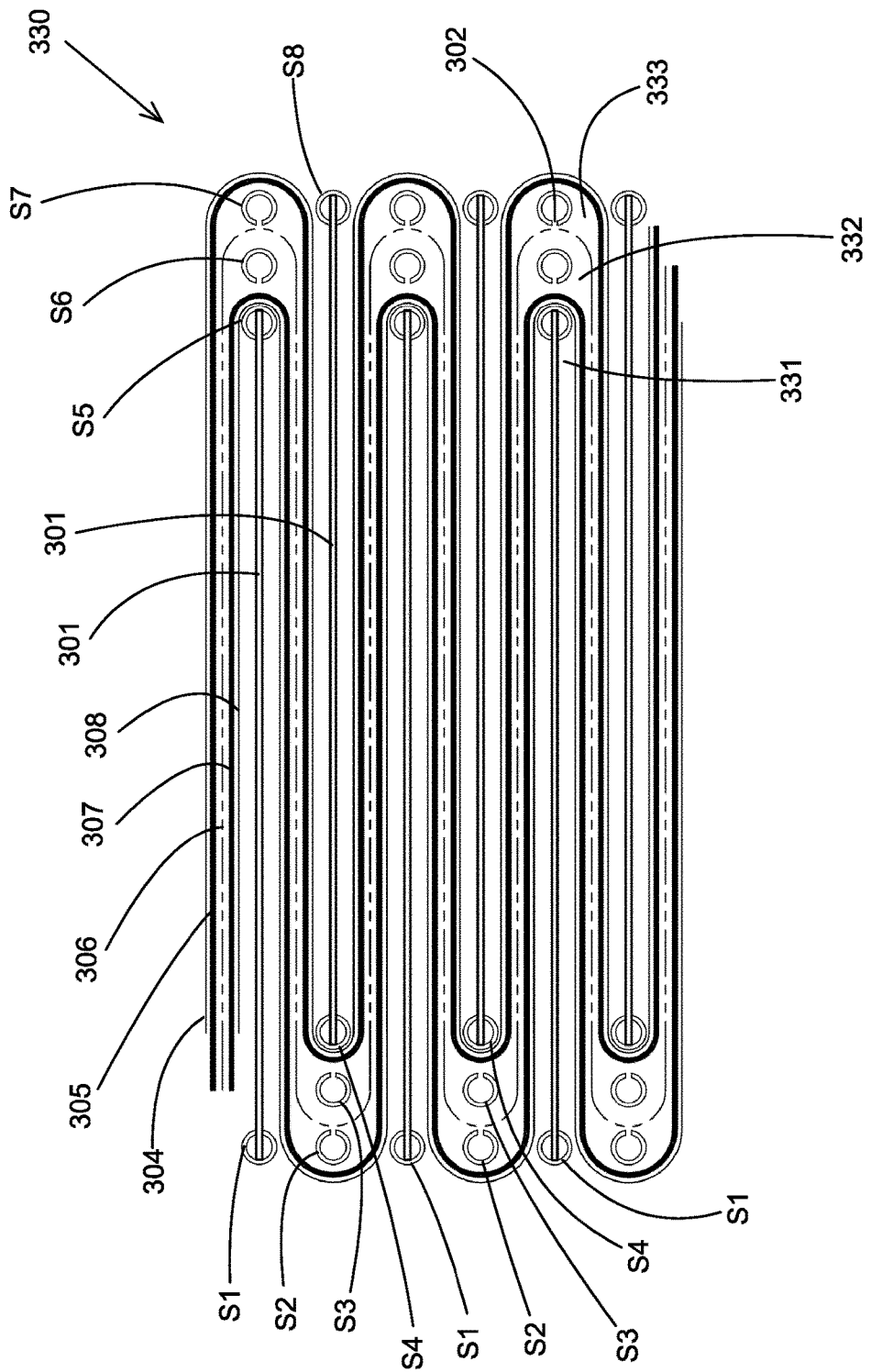

FIGS. 13A and 13B are a schematic view and a side view showing the course of foils and the position of the spacers of another alternative embodiment of a device according to invention;

FIG. 14 is a schematic view showing the course of foils and the position of the spacers of another alternative embodiment of a device according to invention;

FIG. 15 is a side view and a schematic view showing the course of foils and the position of the spacers of another alternative embodiment of a device according to invention.

In the Figures, like parts are provided with the same reference numerals.

FIGS. 1A-1E show side views of a machine 1 according to the invention, which is suitable for the manufacture of a device according to the invention. The machine 1 is provided with at least two disc-shaped elements 3, rotatable about a centerline 2. Each disc-shaped element 3 is provided with passages 5 situated on a circle 4 having a diameter d. The number of passages 5 is at least equal to the number of six supports 6 that the device 7 to be manufactured should include on a side facing the central axis 8. During the manufacture of the device 7, the central axis 8 coincides with the centerline 2 of the disc-shaped elements 3. With the exemplary embodiment displayed in FIGS. 5A-5H1, the device 1 comprises six supports 6 on a side facing the central axis 8. The six passages 5 are hereby situated at an equal distance from each other on the circle 4. The disc-shaped elements 3 are situated in axial direction at a distance from one another, which preferably corresponds to the width of the wrapping foil. The apparatus 1 is further provided with a substantially horizontally extending carrier 9, substantially extending at the level of the centerline 2. The carrier 9 is provided with two guides 10, extending parallel to each other, transversely to the centerline 2 and which are situated on both sides of the two disc-shaped elements 3. Over the guides 10 are two foil roll holders 11, 12 translatable in a direction and opposite a direction to the one facing centerline 2, indicated by arrow P1. In each foil roll holder 11, 12 a roll 13, 14 with foil is situated, which rolls 13, 14 are rotatable around centerlines 15, 16 with respect the foil roll holder 11, 12, for the unwinding of the foil from the roll 13, 14.

The operation of the device 1 will be explained further with reference to the FIGS. 5A1-5H1.

FIGS. 2A and 2B show a top view and side view of a spacer 17 of a device 7 according to the invention. The spacer 17 includes a mesh-shaped layer 18 which is formed by two sets of plastics threads 19, 20 which each enclose an angle of preferably 15-45 degrees with the longitudinal side 22 of the spacer 17, and which cross each other. The wires 19, 20 are preferably 0.5 to 2.5 mm thick. The mesh-shaped layer 18 is therefore 1 to 5 mm thick, in particular in the places where the wires 19, 20 cross each other. When flowing through the mesh-like layer 18, the flow length is substantially the same everywhere; there are no preferred currents and there are no variable pressure drops. Such a mesh-like layer 18 is also known from NL1035752 of the applicant, and will, therefore, no further be explained. The spacer 17 of the device 7 according to the invention is further provided with thicker portions 21, which are connected with the short sides 23 extending transverse to the longitudinal sides 22. The thicker portions 21 have a thickness that is such, that the thickness of the short side 23 at the location of the thicker portion is greater than the thickness of the mesh-like layer 18. The thicker portions 21 extend only over a part of the short side 23, so that a fluid can flow at least between the thicker portions 21. With the exemplary embodiment shown FIG. 2A, each short side 23 comprises three thicker portions 21, which are situated at a regular distance from each other. The thicker portions 21 can be made of the same material as the wires 19, 20, or may be made of a different material. It is even possible to produce the thicker portions of a material that, after the manufacture of the device 7, dissolves in the fluid during use of the device 7, so that the thicker portions 21 are only present during and shortly after the manufacturing process. Such a soluble material is, for example, a medicinal soluble suture such as catgut or material of polylactic acid or of gelatin, salt, sugar, etc. With a soluble material, the thicker portion 21 may also extend over the entire short side 23.

FIGS. 3A-3C show respectively a side view, a cross-section and an enlarged cross-section of a support 6 of a device 7 according to the invention.

The support 6 is tubular and is provided with an elongated slot 24, extending in axial direction. The slot 24 extends from a first end 25 of the support 6 up to a predetermined distance from the second end 26. The width of the slot 24 in the tangential direction is smaller than the thickness of the spacer 17 at the location of the thicker portion 21, but larger than the thickness of the mesh-like layer 18.

FIGS. 4A-4C show, respectively, a top view, a side view and an enlarged view of a spacer 17 connected to support 6. For the connection of the spacer 17 with the support 6, the short side of the spacer 17 is inserted into the first end 25 of the tubular support 6, whereas the thicker portions 23 are positioned in the tubular support 6 while the mesh-shaped layer 18 extends through slot 24. Near the second end 26, a further movement of the mesh-like layer 18 is prevented by the end 27 of the slot 24. The end 27 of the slot 24 forms a stop for the mesh-like layer 18. If it is preferred to stretch the mesh-shaped layer 18 over the entire length of the support 6, the mesh-shaped layer 18 near the second end 26 of the support 6 preferably has a notch (not shown) so that at the location of the notch the mesh-like layer 18 is not situated within the support 6.

With the spacer 17, depicted in the FIGS. 4A-4B, both short sides 23 are each situated within a support 6.

FIGS. 5A1 and 5A2-5H1 show side and rear views of a part of the machine 1 shown in FIGS. 1A-1E, and of the device 7 according to the invention, at various steps during the execution of the method according to the invention.

The manufacture of a device 7 according to the invention is as follows.

Depending on the type of device 7 one wishes to manufacture, a roll or rolls 13, 14 of a heat-conductive foil, a membrane foil or combination thereof is placed in the foil roll holders 11, 12.

The foil roll holders 11, 12 are placed in an initial position at the left-hand side of the carrier 9 that is averted from the disc-shaped elements 3. The distance between the initial position of the foil roll holders 11, 12 and the centerline 2 corresponds hereby approximately to the length of the foil layers to be formed and of the spacers 17. Subsequently, the foil roll holders 11, 12 are moved in the direction indicated by the arrow P1, where the foil of the roll 13, 14 or rolls 13, 14 is unwound, and a first foil layer 29 is formed, which is supported by the carrier 9. The foil roll holders 11, 12 are moved beyond the central axis 2, to the position shown in FIG. 1c.

Between the disc-shaped elements 3, a supporting tube 28 is located, with a diameter that is equal to the diameter d of the circle 4 minus the diameter of the tubular support 6. Next, a first support 6 is positioned between the disc-shaped elements 3, wherein the passages 5 are located in line with the tubular support 6. In the passages 5 and in the support 6 fastening elements will then be mounted, such as for example a bolt or pin, as a result of which the support 6 is detachably connected to the disc-shaped elements 3. The support 6 is preferably located at the height of the carrier 9 between the initial position of the foil roll holders 11, 12 and the centerline 2. With the support 6 a spacer 17 has already been coupled, which is also provided with a support 6 at an end that is averted from the first support 6. The spacer 17 abuts here against the first foil layer 29 (FIG. 1C, 5B1, 5B2).

Figure 1A:
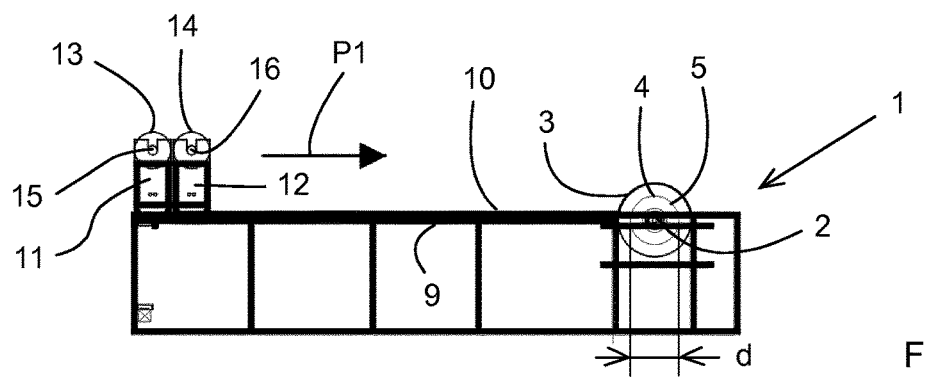
FIGS. 1A-1E, show side views of a machine according to the invention, which is suitable for the manufacture of a device according to the invention, wherein the machine is shown in different processing positions.
Figure 1B:
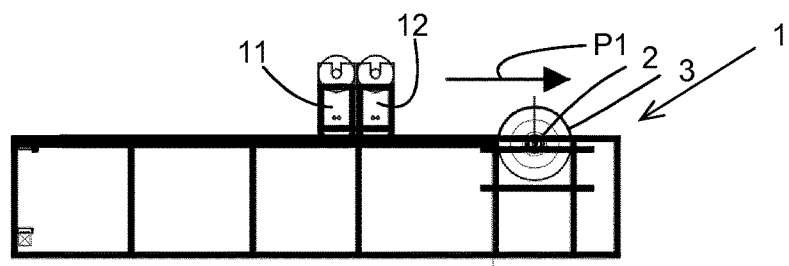
Figure 1C:
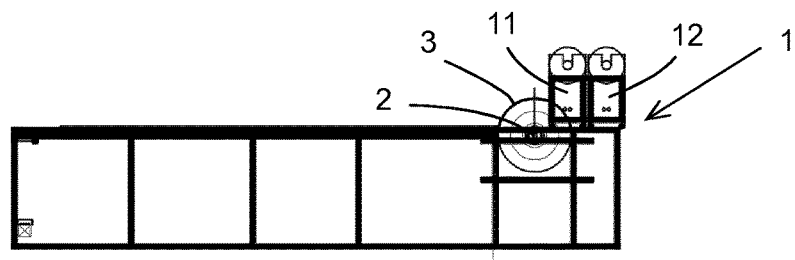
Figure 1D:
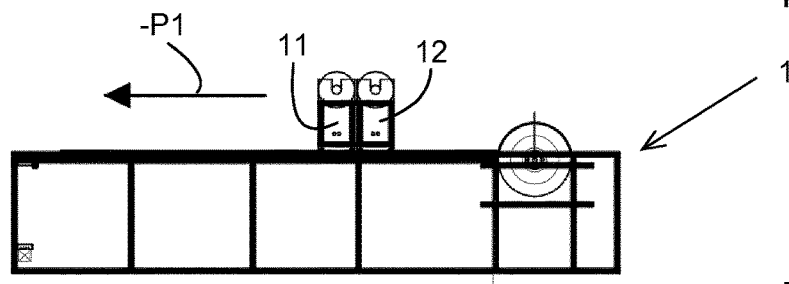
Figure 1E:
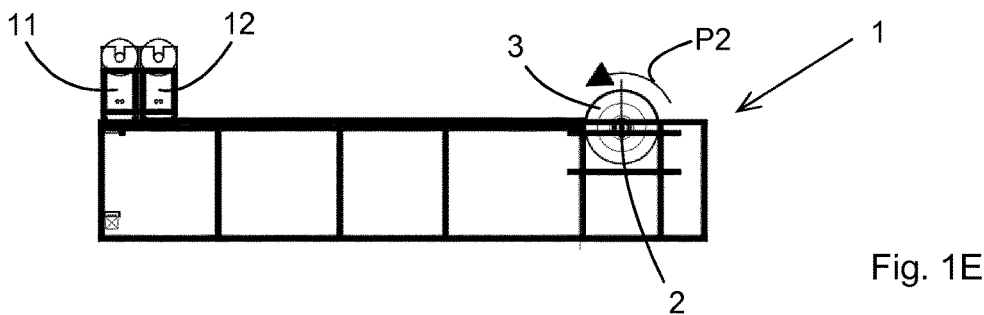

Thereafter, the foil roll holders 11, 12 are moved in the direction opposite to arrow P1, while the foil of the roll 13, 14 is unwound, and a second foil layer 29 is applied on the spacer 17. The foil is here wrapped around the support 6, whereby a folding line is formed by the support 6, which extends parallel to the centerline 2. The foil roll holders 11, 12 are moved to the initial position (FIG. 1E). The disc-shaped elements 3 will now be rotated in a direction indicated by arrow P2 through an angle that is equal to 360 degrees, divided by the number of supports 6 to be mounted on the circle 4. With the illustrated example, there are six supports and so the angle will be 60 degrees.

Subsequently, a second support 6 is positioned between the disc-shaped elements 3, wherein the passages 5 are located in line with the second support 6. In the passages 5 and in the second support 6 then fastening elements are mounted, so that the second support 6 is detachably connected to the disc-shaped element 3. The second support 6 is preferably located at the height of the carrier 9, between the initial position of the foil roll holders 11, 12 and the centerline 2. With the second support 6 a spacer 17 has already been coupled, which is also provided with a support 6 at an end that is averted from the second support 6 (FIG. 5C1, 5C2). The spacer 17 abuts here against the second foil layer 29.

The above-indicated steps of applying a foil layer 29, the rotation of the disc-shaped elements, the application of the supports and spacer, the application of a foil layer 29 etc. will be repeated so long until six spacers 17 and therewith connected supports 6 are coupled with the disc-shaped elements 3, and are located between the foil layers (FIG. 5D1, 5F2, 6). All foil layers and spacers 17 extend here parallel to one another and to the carrier 9. As is clearly visible in FIG. 6, of the supports 6 located near the centerline 2, first plurality of supports 6 is situated between two foil layers 29, which foil layers are connected with one another near the centerline 2. The foil is wrapped about each of this first plurality of supports. Also is further clearly visible in FIG. 6 that, of the supports 6 close to the centerline 2, a second plurality of supports 6 is situated between two successive supports 6 of the first plurality of supports 6. No foil has been wrapped around these supports 6. Looking in circumferential direction of the support tube 28, there is foil wrapped around the one support 6 and no foil wrapped around the next support 6.

In order to keep the relatively thin foil layers tight, weights can be hung for instance to the supports 6 that are situated on a side averted from centerline 2, so that the spacers 17 and thus also the wrapped around foil layers are held straight. It is also possible to apply a tension in other ways.

The disc-shaped elements 3 are then rotated about the centerline 2, whereby the entire package of foil layers 29 and spacers 17 are wound spirally around the support tube 28, until the supports 6 that are situated on a side averted from the centerline 2 abut against the spirally wound package. The disc-shaped elements 3 serve here as guiding for the foil layers 29 and the spacers 17. Because the lengths of the foil layers 29 are substantially equal, the supports 6 that are located at the exterior of the cylindrical device 7 will be situated at a greater distance from one another than the interior supports 6, but the mutual distance between the outer supports will substantially be equal (see FIGS. 5G1, 5G2).

The first and last layers of foil are preferably longer, so that after winding, the outer foil layers can be connected with each other by welded or glued joints 32, and that for example the last foil layer can be wrapped around the entire wound module.

Schematically, the foil layers 29 and the spacers 17 are situated in the manner illustrated in FIG. 7, wherein the foil layers 29 form a separating layer between the first space 30 and a second space 31. In this schematic representation the foil layers 29 are not spirally wound, for the sake of clarity, and the foil layers 29 do not abut against the spacers 17 and the supports 6. The number of supports in FIG. 7 amounts to two times twelve, so twenty-four.

During the mounting of the supports 6, the supports of the one spacer 17 are oriented with the first end towards the first axial side of the cylindrical device 7, whereas the next spacer 17 is oriented with the first end towards the second axial side of the cylindrical device 7.

After the formation of the cylindrical device 7, the fastening elements are removed from the disc-shaped elements 3, after which the cylindrical device 7 can be taken from between the disc-shaped elements 3.

Figure 8D:
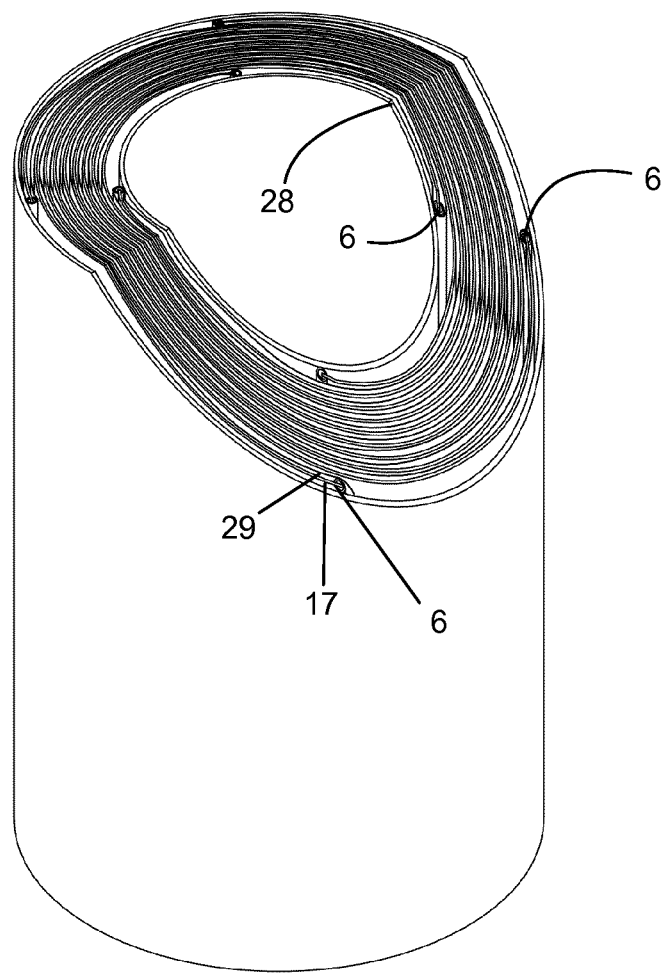
Figures 11A, 11B:
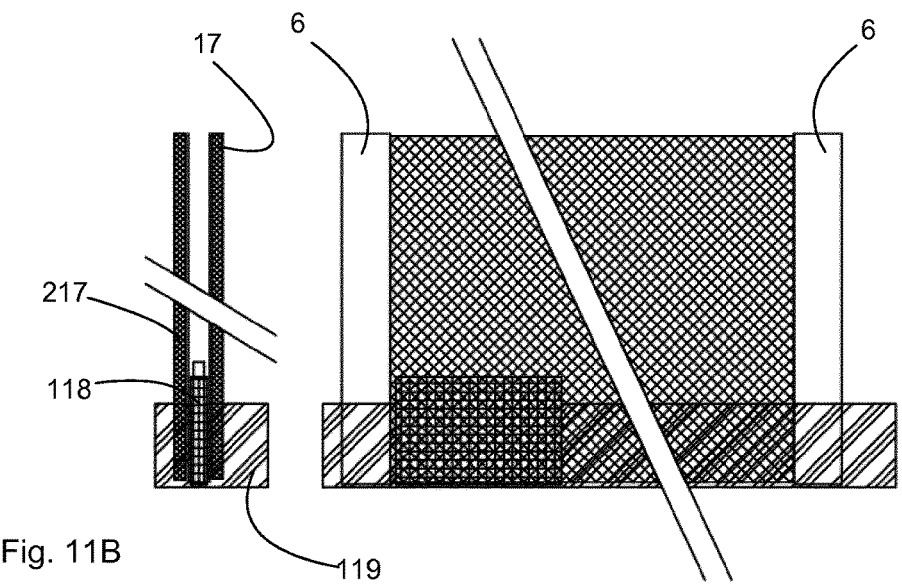
Figures 12A, 12B:
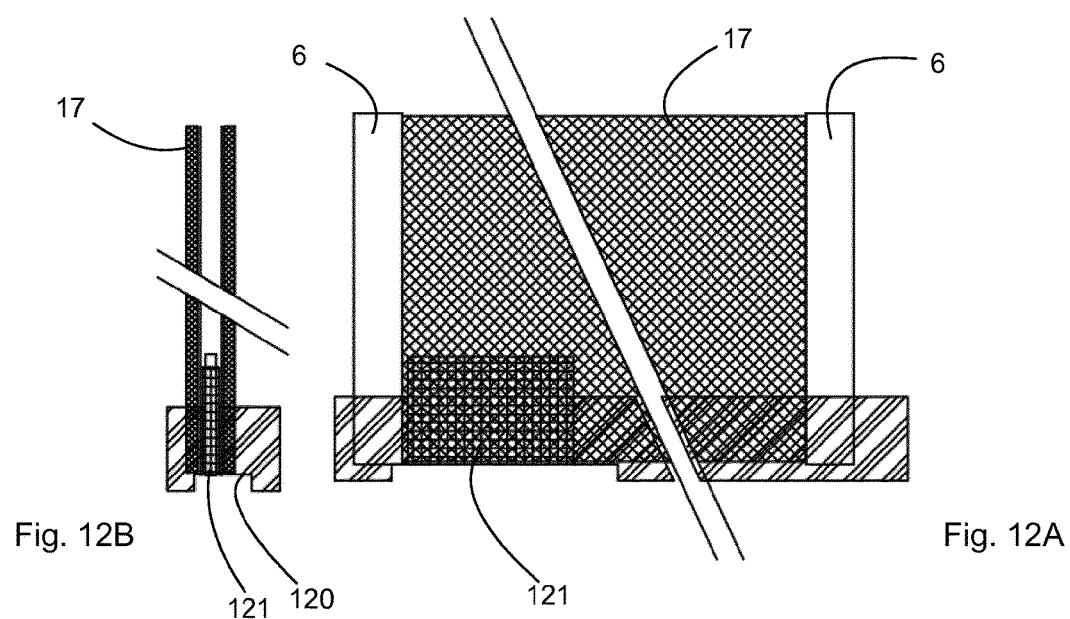

FIGS. 8A-8D show cross-sectional views and a perspective view of a device according to the invention with four supports 6 located on the inside, and four supports 6 located on the outer side. FIGS. 8A and 8B are parts of the entire device 1 shown in FIG. 8C. In FIG. 8A, the spacers 17 are omitted, whereas in FIG. 8B the foil is omitted, so that the Archimedes-spiral gradient is clearly visible. If desired, the support tube 28 can be removed after the manufacture of the device 1, so that the entire central space can be used as a supply or drainage.

The relationship between the length L of the spacers 17, the number of windings N, the inner diameter d, the number of spacers M and the thickness of the spacer m is approximately equal to:

$$L = N \cdot (\pi \cdot d + 2 \cdot M \cdot m) + 2 \cdot \pi \cdot M \cdot m \cdot \sum_{i=1}^{N} (i-1) \Leftrightarrow L =$$
$$N(\pi \cdot d + 2 \cdot M \cdot m) + 2 \cdot \pi \cdot M \cdot m \cdot \left[\frac{1}{2}(N-1)(N-1) + \frac{1}{2}(N-1)\right] \Leftrightarrow$$
$$L = N \cdot \pi \cdot (d + 2 \cdot M \cdot m) + \pi \cdot M \cdot m \cdot N \cdot (N-1)$$

The relationship between the inner diameter d, the final diameter D, the number of spacers M, the length of the spacers L and the thickness of the spacer m is approximately equal to:

$$D = \left[d^2 + \frac{4}{\pi} M \cdot L \cdot m\right]^{1/2}$$

Both axial sides are now provided with a seal, such as a resin or a kit. Because of the seal, the longitudinal sides of the foil layers 29 and the spacers 17 are connected to on another and the first ends 25 of the supports 6 are closed.

Then the second ends are opened again and the second ends of the inner supports 6 on the first axial side are connected to a first fluid channel, the second ends of the inner supports 6 on the second axial side are connected to a second fluid channel, the second ends of the outer supports 6 on first axial side are connected to a third fluid channel and the second ends of the outer supports 6 on the second axial side are connected to a fourth fluid channel.

The first fluid channel is in connection with the third fluid channel via the first space 30 bounded by the foil layers 29, whereas the second fluid channel is in connection with the fourth fluid channel via the second space 31 bounded by the foil layers 29.

The tubular supports 6 have a number of functions, such as attachment means for the spacers during manufacture, as supply- and discharge channel for the fluids to be processed, as protection of the foil against sharp edges of the spacers and for the creation of a homogeneous, smooth flow in the spacer.

FIGS. 9A-9B and 10A-10B show views of an alternative embodiment of a part of a device according to the invention, wherein the supports 106 are not tubular and wherein the supply and discharge of fluid to and from the device subsequently can not be performed by the supports 106. To still be able to access the space between the foil layers 29, a plastic pouch 118 is attached around one side of the mesh-like spacer 117, which partially covers a longitudinal side of the spacer 117. After winding, the axial ends of the device are provided with a seal, such as a resin layer 119. This resin layer 119 closes the gaps between the longitudinal sides of the foils 29 and the spacers 117 entirely (see FIGS. 9A and 9B).

Then, a slot 120 is provided in the resin layer 119 at the location of the plastic bag 118, for example by milling. By this procedure the plastic bag 118 is partially removed and access is gained to the side 121 of the spacer 117, via which side 121 fluids can be supplied or discharged. In the embodiment illustrated in the FIGS. 9A-9B, a similar plastic bag is attached both bottom left and top right, so that a supply and discharge channel is realized.

FIGS. 11A-11B and 12A-12B show views of an alternative embodiment of a part of a device according to the invention, wherein the supports 6 are tubular and in which two foils are wrapped around the supports 6. In this embodiment, four spaces are formed. Via the tubular supports fluid may be supplied to two separate spaces or discharged from these spaces. Between the foils also two spaces are formed. To access these two spaces, a relatively small local spacer 217, provided with a plastic pouch 118, is attached during manufacture near the supports 6 between two foils, in the same manner as is illustrated in the embodiment in the FIGS. 9A-9B.

After winding, the axial ends of the device are provided with a seal, such as a resin layer 119. This resin layer 119 closes the gaps between the longitudinal sides of the foils and the spacers 17, 217 entirely (see FIGS. 11A and 11B).

Then a slot 120 is provided in the resin layer 119 at the location of the plastic bag 118, for example by milling. By this procedure the plastic bag 118 is partially removed and access is gained to the side 121 of the spacer 217, via which side 121 fluids can be supplied or discharged.

FIGS. 13A and 13B are a schematic view and a side view of another alternative embodiment of a device 300 according to invention.

In the schematic representation in FIG. 13A the foil layers and spacers are not spirally wound and are spaced apart, for the sake of clarity.

The device 300 comprises near the central axis 8, first tubular supports S4, second tubular supports S1 and additional tubular supports S2, S3. On a side avert of the central axis 8, the device 300 comprises tubular supports S5, S8 and additional tubular supports S6, S7. A spacer 301 extends between and is connected to the supports S1, S5 and to the supports S4, S8 in the same manner as described above.

The additional supports S2, S3, S6, S7 are tubular and provided with a longitudinal aperture 302.

In FIG. 13A the supports S4 and additional supports S2, S3 are shown on the same horizontal level, for the sake of clarity. However, in the device 300 as shown in FIG. 13B it can be seen that near the central axis 8 all supports and additional supports are located on a circle 303 in the order S1, S2, S3, S4, S1, etc. The same holds true for the supports S5, S6, S7, S8, S5 etc. which are located near the outside of the device 300.

The device 300 is provided with a first foil 304, a first foil like spacer 305, a second foil 306, a second foil like spacer 307 and a third foil 308 extending parallel to each other but each wrapped around the supports S1, S4, S5, S8 and the additional supports S3, S4, S6, S7 in a different way.

As can be seen in FIG. 13A, the first foil 304 extends around the support S5 and the additional supports S6, S7 on the outer side of the device 300 and around the support S4 on the inner side of the device 300.

The first foil like spacer 305 extends around the support S5 and the additional supports S6, S7 on the outer side of the device 300 and around the additional support S3 and the support S4 on the inner side of the device 300.

The second foil 306 extends around the support S5 and the additional support S6 on the outer side of the device 300 and around the additional support S3 and the support S4 on the inner side of the device 300.

The second foil like spacer 307 extends around the support S5 and the additional support S6 on the outer side of the device 300 and around the additional supports S2, S3 and the support S4 on the inner side of the device 300.

The third foil 308 extends around the support S5 on the outer side of the device 300 and around the additional supports S2, S3 and the support S4 on the inner side of the device 300.

The device 300 is made in the same manner as the device described above, except that five foil roll holders are being used, one for each of the foils 304, 306, 308 and the foil like spacers 305, 307.

No foils are wrapped around the supports S1 and S8. If desired a complete set of foils 304-308 may be wrapped around the whole stack of foils, supports and additional supports to connect the ends of the foils to each other.

By wrapping the foils 304, 306, 308 and the foil like spacers 305, 307 in this manner, three separate spaces 300, 310, 311 are created in which different fluids can be guided to be processed. The foils 304, 306, 308 can be membranes or heat exchange layers.

FIG. 14 is a schematic view of another alternative embodiment of a device 320 according to invention. The device 320 differs form the device 300 in the way the foils 304, 306, 308 and the foil like spacers 305, 307 are wrapped around the supports S1, S4, S5, S8 and the additional supports S2, S3, S6, S7.

As can be seen in FIG. 14, the first foil 304 extends around the support S5 and the additional supports S6, S7 on the outer side of the device 320 and around the support S4 on the inner side of the device 320.

The first foil like spacer 305 extends around the support S5 and the additional support S6 on the outer side of the device 320 and around the support S4 on the inner side of the device 320.

The second foil 306 extends around the support S5 and the additional support S6 on the outer side of the device 320 and around the additional support S3 and the support S4 on the inner side of the device 320.

The second foil like spacer 307 extends around the support S5 on the outer side of the device 320 and around the additional support S3 and the support S4 on the inner side of the device 320.

The third foil 308 extends around the support S5 on the outer side of the device 320 and around the additional supports S2, S3 and the support S4 on the inner side of the device 320.

The device 320 is made in the same manner as the device 300 described above.

By wrapping the foils 304, 306, 308 and the foil like spacers 305, 307 in this manner, three separate spaces 321, 322, 323 are created in which different fluids can be guided to be processed. The foils 304, 306, 308 can be membranes or heat exchange layers.

FIG. 15 is a schematic view of another alternative embodiment of a device 330 according to invention. The device 330 differs form the devices 300, 320 in the way the foils 304, 306, 308 and the foil like spacers 305, 307 are wrapped around the supports S1, S4, S5, S8 and the additional supports S2, S3, S6, S7.

As can be seen in FIG. 15, the first foil 304 extends around the support S5 and the additional supports S6, S7 on the outer side of the device 330 and around the support S4 on the inner side of the device 330.

The first foil like spacer 305 extends around the support S5 and the additional supports S6, S7 on the outer side of the device 330 and around the support S4 on the inner side of the device 330.

The second foil 306 extends around the support S5 and the additional support S6 on the outer side of the device 330 and around the additional support S3 and the support S4 on the inner side of the device 330.

The second foil like spacer 307 extends around the support S5 on the outer side of the device 330 and around the additional supports S2, S3 and the support S4 on the inner side of the device 330.

The third foil 308 extends around the support S5 on the outer side of the device 330 and around the additional supports S2, S3 and the support S4 on the inner side of the device 330.

The device 330 is made in the same manner as the devices 300, 320 described above.

By wrapping the foils 304, 306, 308 and the foil like spacers 305, 307 in this manner, three separate spaces 331, 332, 333 are created in which different fluids can be guided to be processed. The foils 304, 306, 308 can be membranes or heat exchange layers.

The outer surface of the cylindrical device 7 may be provided with a reinforcement layer, such as a tape.

The number of windings is preferably 1 to 7. The number of tubular supports is preferably even, is at least 4 and is for instance between 4 and 24. The inner diameter is preferably between 50 and 90 mm. The outer diameter is preferably between 250 and 500 mm. The thickness of the foil is preferably between 50 and 120 micrometers. The thickness of the spacer is preferably between 1 and 3 mm. The width of the foil and spacer is preferably between 300 and 1000 mm. The length of the spacer is preferably between 0.8 and 6 meters.

It is also possible to provide the slot in the tubular support with barbs, which can be coupled to the spacer for the attachment of the spacer to the tubular support.

It is also possible to tie the spacer to the support with the aid of wires, whereby the wires extend through apertures in the mesh-shape or extend through the spacer.

It is also possible to apply the tension force on the spacers during the winding process. The material of the foil and spacer may be any material suitable for the desired application of the device.

It is also possible during manufacture to first apply a spacer on the carrier and then the first foil layer. The spacer is firmer and glides more easily over the carrier than the foil layer.

It is also possible to provide the elements with a different shape, instead of the disc-shaped elements.

It is also possible that the disc-shaped elements are part of the final device.

It is also possible to apply a gearwheel-like element, instead of a disc-shaped element with passages, whereby the supports are clamped between the teeth of the gearwheel-like element.

It is also possible to provide only one or none of the spacers with a thicker position 21 but only slide the spacers into the slots.

It is also possible that both ends of the tubular support are closed, where by a modified form of the slot in the support, the application of the spacer and the supply and discharge of fluid are possible.

The invention claimed is:

1. Device for processing at least one fluid, said device is provided with at least one elongated foil, made of a heat-conducting foil, a membrane foil or a combination thereof, said at least one elongated foil is formed into a number of reciprocating foil layers, each pair of two opposite foil layers forming a set, wherein between each set of two opposite foil layers of the reciprocating foil layers a spacer is situated, said spacer is permeable at least parallel to the reciprocating foil layers, said sets of two opposite foil layers with said spacers extending spirally around a central axis, wherein a folding line between each set of two opposite foil layers extends parallel to the central axis, wherein the device comprises
    tubular supports extending parallel to the central axis, wherein each spacer is coupled at least at an end of said spacer near the central axis with one of said tubular supports wherein first tubular supports and second tubular supports of said tubular supports are located near the central axis and said first tubular supports are each situated between said sets of two opposite foil layers, said two opposite foil layers of each set are interconnected near the central axis at each folding line, each folding line is formed by said respective first tubular support, and the second tubular supports are situated between two successive first tubular supports,
    wherein at least the first and second tubular supports near the central axis are alternately connected to a first and second fluid channel, forming a first and second set of the first and second tubular supports said first set of the first tubular supports being located in a first space that is separated by the reciprocating foil layers from a second space, and said first and second spaces are connected to said first and second fluid channels, respectively,
    wherein each of the first and second tubular supports near the central axis are provided with at least one aperture facing the spacer to which each tubular support is connected, said aperture is configured to function as a supply or discharge channel of a fluid to be processed by the device, and
    wherein axial ends of said spirally wound sets of foil layers are sealed by means of a seal, wherein an entire axial side of the device is sealed with the exception of passages in ends of said tubular supports.

2. Device according to claim 1, wherein each of said spacers is coupled at both ends with one of the first and second tubular supports.

3. Device according to claim 1, wherein said at least one aperture comprises an elongated slot extending parallel to the central axis, in which the end of the spacer is situated.

4. Device according to claim 3, wherein the end of the spacer located in the tubular support is provided with a thicker portion that extends over at least a part of said end.

5. Device according to claim 3, wherein said elongated slot extends from a first end of each tubular support to a predetermined distance from a second end of each tubular support.

6. Device according to claim 5, wherein at least the tubular supports near the central axis are positioned alternately with said first and second ends to axial ends of said spirally wound foil layers and spacers.

7. Device according to claim 1, wherein the tubular supports at a first end of the spacers are located near the central axis, and the tubular supports at a second end of the spacers are located remote to the central axis relative to the tubular supports near the central axis, wherein the tubular supports located remotely to the central axis are connected to a third and fourth fluid channel wherein the first and third fluid channels are connected to the first space, whereas the second and fourth fluid channels are connected to the second space.

8. Device according to claim 7, wherein said first fluid channel is positioned at a first axial end of said spirally wound foil layers and spacers, and wherein said second fluid channel is positioned at a second axial end of the spirally wound foil layers and spacers, said second axial end being spaced apart from the first fluid channel.

9. Device according to claim 8, wherein said tubular supports, connected at said first and second axial ends with the first and second fluid channels, are sealed at the second and first axial ends.

10. Device according to claim 1, wherein a sealing foil portion of said at least one elongated foil is connected to a first foil layer, extending towards and being connected to a last foil layer and extending towards and again being connected to the first foil layer.

11. Device according to claim 1, wherein said tubular supports near the central axis are positioned around a central support tube.

12. Device according to claim 1, wherein at least near the central axis at least one additional tubular support is situated between one of said first tubular supports and one of said second tubular supports, where, of said tubular supports near the central axis, the first tubular support is situated between two foil layers of a first foil, said two foil layers of the first foil are connected to one another near the central axis, whereas the additional tubular support, the two foil layers of a first foil as well as the first tubular support are situated between two foil layers of a second foil, said two foil layers of the second foil are connected to one another near the central axis.

13. Device according to claim 12, wherein said additional tubular support is provided with at least one aperture located between the first and second foil.

\* \* \* \* \*